L. S. CHADWICK.
COOKING UTENSIL.
APPLICATION FILED MAY 8, 1917.
1,334,930.                                  Patented Mar. 23, 1920.
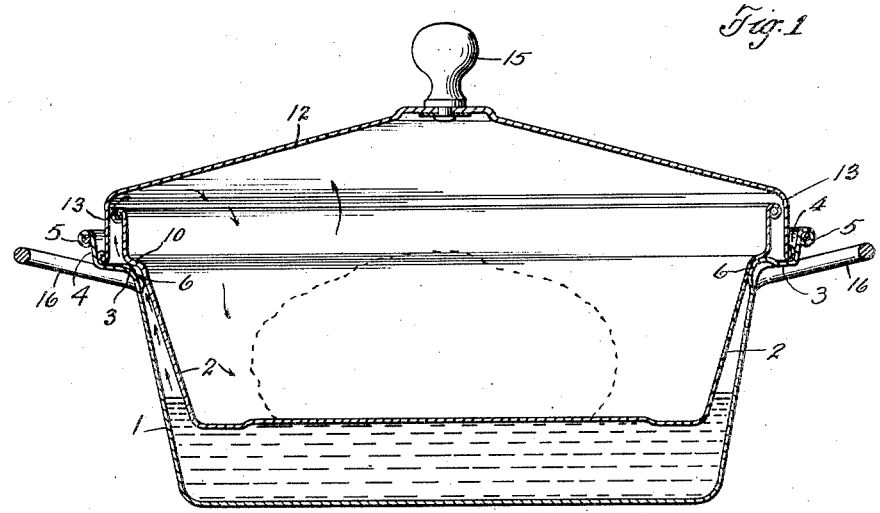
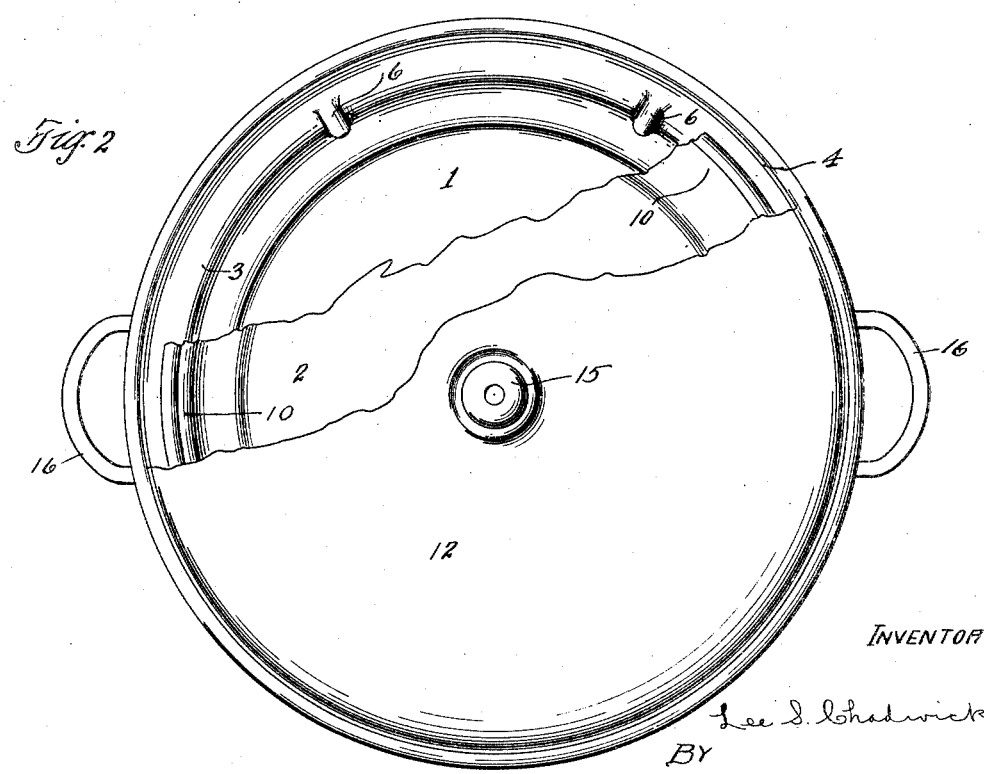

UNITED STATES PATENT OFFICE.

LEE S. CHADWICK, OF CLEVELAND, OHIO, ASSIGNOR TO THE CLEVELAND METAL PRODUCTS COMPANY, OF CLEVELAND, OHIO, A CORPORATION OF OHIO.

COOKING UTENSIL.

1,334,930.   Specification of Letters Patent.   Patented Mar. 23, 1920.

Application filed May 8, 1917. Serial No. 167,179.

*To all whom it may concern:*

Be it known that I, LEE S. CHADWICK, a citizen of the United States, residing at Cleveland, in the county of Cuyahoga and State of Ohio, have invented a certain new and useful Improvement in Cooking Utensils, of which the following is a full, clear, and exact description, reference being had to the accompanying drawings.

This invention relates to an improved cooking utensil particularly of the class generally known as steam cookers.

It has for its object the production of a utensil of this character which is highly efficient, the construction providing for free and easy passage of steam from the outer or water containing vessel to the inner or that containing the food to be steamed, and for a ready return of condensation to the water compartment, all without the need of perforations in the inner vessel (as is usual in utensils of this class), wherefore the various elements of the utensil may be used separately for general purposes.

A construction through which the foregoing object is attained is illustrated in the accompanying drawing forming a part hereof and wherein Figure 1 is a substantially central vertical section through the utensil, and Fig. 2 is a plan view of the utensil with parts of the cover and inner vessel broken away.

For the purpose of description I will refer to the water containing vessel, designated 1 in the accompanying drawing, as the pan, and the receptacle adapted to contain the food stuffs to be steamed as the inner vessel 2. The upper edge of the pan 1 is flared outward to produce a ledge 3, which is turned upward to form a flange 4, wired as indicated at 5. At suitable distances about the circumference of the pan it is provided, at the junction of its side wall and ledge, with projections 6 which are preferably formed by indenting the metal. Adjacent its top edge, the inner vessel is provided with a shoulder 10 adapted to rest upon the projections 6 when the inner vessel is in place within the pan. The cover 12 has a depending peripheral flange 13 which is adapted to fit within the flange 4 of the pan and rest snugly upon the ledge 3.

The cover is provided with a handle 15 and the pan with handles 16.

The course of the steam, when the utensil is in use, is indicated by arrows in Fig. 1 wherein it will be observed that there is nothing to obstruct the free passage of the vapors from the pan upward around and into the inner vessel; and as the steam strikes the cover 12 and condenses, the inclination of the cover causes it to flow down to the edge of the cover, over the ledge 3, and back to the water within the pan. The steam is effectively confined to the vessel and its freedom of circulation therein assures its highest cooking efficiency; and the edge of the cover being contained within the flange 4 of the pan, prevents any dripping of condensed steam onto the stove. Also, as hereinbefore brought out, no holes are required in the inner vessel, as is common in prevailing types of steam cookers, so that the pan and inner vessel may be used independently of each other for general cooking purposes, and the cover 12 may be used with either.

Having thus described my invention, what I claim is:—

1. In a cooking utensil of the class set forth, the combination of an outer vessel having its upper edge flared outward and then flanged upward, an inner vessel having an outwardly extending shoulder, one of said vessels having a plurality of projections spacing the shoulder of the inner vessel from the flared portion of the outer vessel thereby to provide passages between the vessels, and a cover having a depending peripheral flange for engagement within the flange of the outer vessel outside the projections thereby to form a seal between the cover and the flared portion of the outer vessel.

2. In a cooking utensil of the class set forth, the combination of an outer vessel having its upper edge flared outward to produce a ledge and then upward to constitute a flange, said ledge being provided with a plurality of projections spaced inward from the flange, an inner vessel having an outwardly extending shoulder adjacent its upper edge for engagement with the aforesaid projections, there being passages thus provided between the shoulder and ledge and a cover inclined downward and outward from its center and having a peripheral depending flange resting upon the ledge of the outer vessel outside the projections thereby to form a seal between the cover and ledge.

3. In a cooking utensil of the class set forth, the combination of an outer vessel, an imperforate inner vessel, said vessels having shoulders, that of the latter being arranged to overlie the shoulder of the former when the inner vessel is inserted within the outer, and a cover closing the outer vessel, one of the aforesaid shoulders having a plurality of projections for spacing the other shoulder from it thereby to provide for the passage of steam upwardly from the outer vessel about and to the interior of the inner vessel.

In testimony whereof, I hereunto affix my signature in the presence of two witnesses.

LEE S. CHADWICK.

Witnesses:
W. E. SHEPPARD,
H. B. McGILL.